Feb. 24, 1970     E. A. WUTTIG     3,497,711
SYNCHRONIZING SYSTEM FOR MULTIPLE GENERATOR SETS
Filed Nov. 24, 1967     2 Sheets-Sheet 1

INVENTOR
EGON WUTTIG

BY *D. Hodges*

ATTORNEY

United States Patent Office 3,497,711
Patented Feb. 24, 1970

3,497,711
SYNCHRONIZING SYSTEM FOR MULTIPLE GENERATOR SETS
Egon A. Wuttig, 23 Kiel, Ostring 47, Germany
Filed Nov. 24, 1967, Ser. No. 685,398
Int. Cl. H02j 1/00
U.S. Cl. 307—87    6 Claims

ABSTRACT OF THE DISCLOSURE

A circuit for paralleling an AC motor generator set with another generator set or a line having the same voltage, frequency and phase characteristics which employs phase sensing between the set to be paralleled and the line voltage to actuate the circuit for switching the set into the line when there is near zero phase difference between the line and the output of the set. The voltage signal from the line and from the set are fed into a transformer to generate a beat frequency envelope which is utilized to control this actuation of a magnetic contactor to close the circuit from the set to the line at a time when the beat frequency envelope is at near zero potential.

---

The invention described herein may be manufactured and used by or for the Government of the United States of America for governmental purposes without the payment of any royalties thereon or therefor.

Background of the invention

In the switching of an additional generator in parallel with a line which is already carrying an alternating current load there is always the problem of the effect on the circuit of any phase shift between the line and the output of the additional generator. This is especially true with systems operating at the higher frequencies, e.g. a 400 cycle system. It is desirable to minimize the transient effects on the system by causing the switching to take place when the systems are exactly or very nearly synchronized.

Prior art devices for this purpose have employed choke coils to damp the transients and electronic time delays to determine the time for switching the circuits. Neither of these approaches to solving the problem was found to be satisfactory for use under all conditions.

Summary

The invention of this application relates to a circuit for paralleling two or more generators having the same voltage, frequency and phase characteristics to produce the minimum transient effect on the circuits and loads fed by the generators. The invention provides a means for accomplishing this desired result by responding to the voltage determined by the envelope of the beat frequencies produced when the voltage signals from the generators are fed in opposition into the primary of a transformer. These signals are taken from the same phase line of each of the generators. The firing point on the envelope of the beat frequency is adjustable to adapt the system to the inherent delays of the switching device.

The invention will be better understood when considered in view of the accompanying drawings and description where:

General description of the invention

Figure 1:
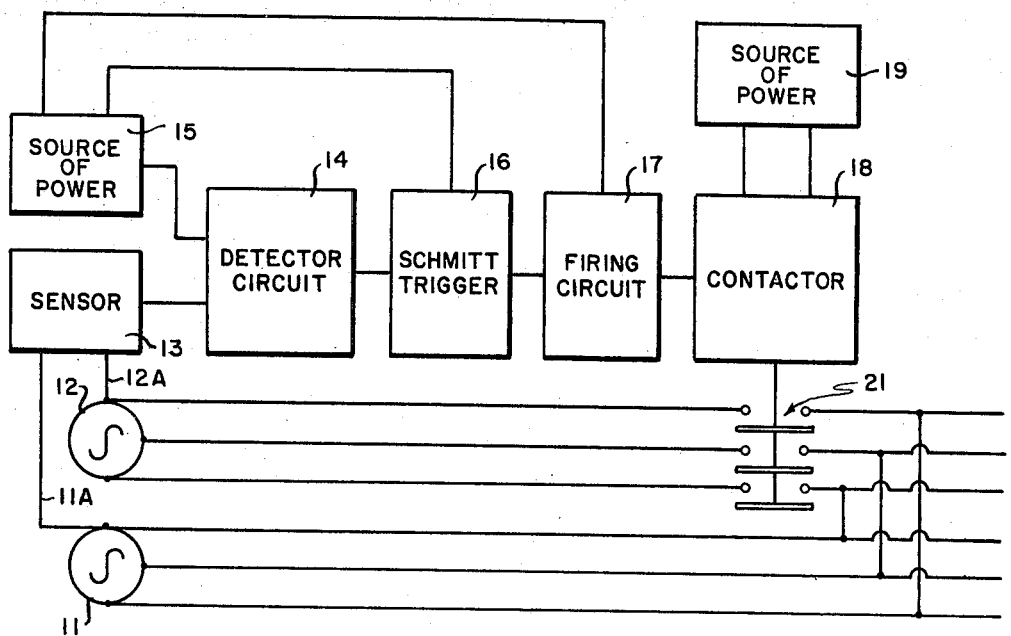
FIG. 1 is a block diagram of the synchronizing system for two generators.

Referring now to the respective figures wherein like reference numerals refer to corresponding parts, there is shown in FIG. 1 a pair of generators 11 and 12 whose outputs are to be connected in parallel, the showing is for a three phase system, though the invention could be applied to systems having a number of phases different from that number. A sensing device 13 is connected to corresponding phase voltages lines 11A and 12A of each of the two generators 11 and 12. The output of the sensor device is an envelope of the beat of oscillation frequency which is fed into a detector circuit 14 which is supplied with power from a source 15. The detector circuit is adjusted to respond to a voltage level in the output of the sensor above a predetermined level and produces a signal which triggers a Schmitt trigger circuit 16 into an "on" condition, i.e. to produce an output. The output of the Schmitt trigger circuit is employed to inhibit functioning of the firing circuit 17. If the voltage level from the sensor is below the set level, the detector 14 remains inoperative and the Schmitt trigger 16 is triggered to remain in the "off" condition, i.e. has no output. In this second condition of the Schmitt trigger the firing circuit operates to actuate a contactor 18, which is supplied with power from a source 19. The contactor operates to throw the two generators into parallel by closing a switch 21.

The foregoing description is a general statement of the circuit and its operation. There follows a more detailed description of a preferred embodiment of the invention:

Description of the preferred embodiment

Figure 2:
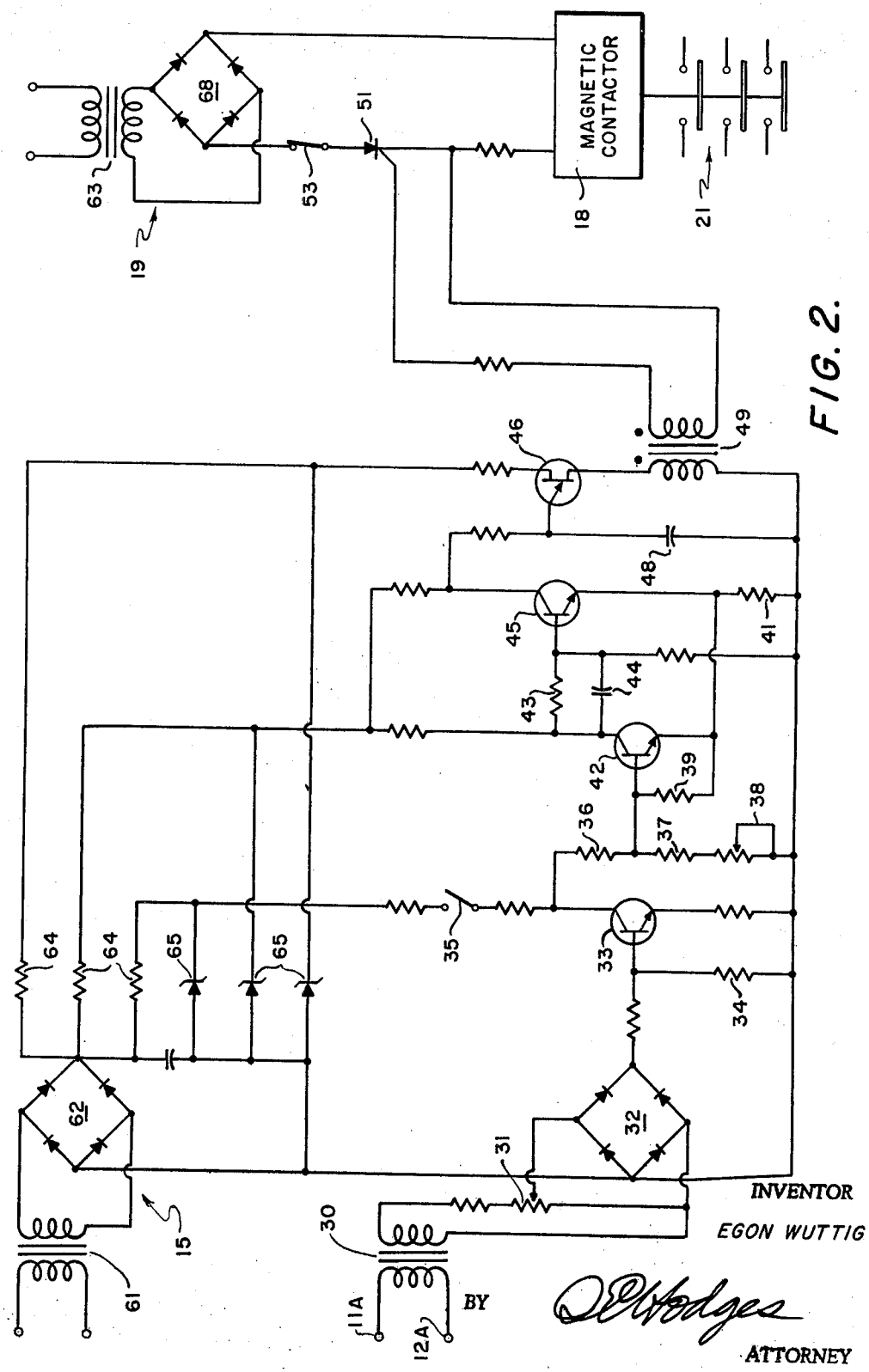
FIG. 2 is a schematic diagram of a circuit embodying the invention.

Referring to FIG. 2 there is shown at 30 a sensing transformer whose primary winding has one terminal 11A connected to one of the generators or to the load line and the other terminal 12A connected to the corresponding phase voltage line of the generator to be switched into parallel. The secondary of transformer 30 is connected across a potentiometer 31 which is adjustable to set the voltage level of the oscillation voltage curve from the transformer 30 within which the detector circuit operates. The detector circuit under predetermined condition functions to prevent the closing of the circuit from the generator to place the generator in parallel with another generator or a line. The voltage taken from the potentiometer 31, is applied across a full wave rectifier 32 to produce a pulsating direct current which is applied to the base of an NPN transistor 33 whose biasing resistor 34 is selected to cause the transistor 33 to conduct heavily when the voltage appearing on the base of transistor 33 is a value such as to locate the Collector-Emitter current above the saturation knee of the characteristic current curve of transistor 33 and to cause the transistor Collector-Emitter current to substantially cut off when the voltage falls below that level.

When the switch 35 located in the collector circuit of the transistor 33 is closed it connects transistor 33 to a source of power 15 and starts the circuit functioning to automatically place the second generator in parallel with the first generator or with a line having similar voltage and phase characteristics. The current through a resistance network including resistors 36, 37, 38, 39, and 41 applies a voltage to the base of transistor 42 whose emitter is connected to ground through an appropriate current limiting resistance 41. This voltage applied to the base of transistor 42 is sufficient to cause it to conduct heavily through the Collector-Emitter circuit when transistor 33 is substantially cut off, but when transistor 33 is conducting heavily, transistor 42 is substantially cut off.

Transistor 42 has its collector connected to the source of power 15 and through a resistance capacitance network comprising resistance 43 connected in parallel with capacitor 44 to the base of transistor 45.

Transistor 45 has its emitter connected to ground through a current limiting resistor 41. The collector of transistor 45 is connected to the source of power 15 and to the emitter of a unijunction transistor 46 through an appropriate resistor 47. The emitter of unijunction transistor 46 is connected to ground through a capacitor 48. One base electrode of the unijunction transistor 46 is connected to the source of power 15 and the other base electrode is connected through the primary of a transformer 49 to ground.

The secondary of transformer 49 is connected to cause a controlled rectifier 51 to fire thereby closing the circuit from a second power source 19 to the magnetic contactor 18 to cause it to close switch 21, which places the second generator on the line. Since the controlled rectifier 51, when it fires, is no longer controlled by the output of transformer 49, a switch 53 is provided to break the power circuit to the contactor 18 from the power source 19 to stop the operation of the synchronizing system. The power source 15 may for example comprise a transformer 61 connected to the normally available 115 v. 60 cycle power line. The output is rectified by a full wave rectifier 62 and fed through appropriate resistances to the circuit elements. The selected voltage for the various circuit elements may be set by appropriate Zener diodes 65 connected in parallel with corresponding resistance.

The source 19 also comprises a transformer 63 and a full wave rectifier 68.

Description of the operation

In operation it is assumed that the two generators to be paralleled are operating at their rated revolutions per minute and are adjusted to the same frequency and voltage and have the same phase characteristics, e.g. 400 cycles, 115 volts and three phases. When it is desired to connect an additional generator to line having the characteristics suggested in the example, the switch 35 is closed. This causes current to flow through transistor 33 and resistances 36, 37, 38, 39, and 41. If the voltage level from rectifier 32 is below a value determined by the characteristics of transistor 33 the conduction through 33 is minimal and the principal flow of current is through resistances 36, 37 and 38. When the principal current flow is through these resistances the voltage appearing at the base of transistor 42 is sufficient to cause transistor 42 to conduct heavily. Such a heavy conduction through transistor 42 shorts out the voltage on the base of transistor 45 causing transistor 45 to be substantially cut off. The cutting off of transistor 45 causes the voltage appearing at the base of unijunction transistor 46 to fire transistor 46 and cause a pulse of current to flow through transformer 49. Transformer 49 has its output connected across the silicon controlled rectifier 51 to fire this rectifier and actuate the switch 21 to thereby place the generators in parallel.

If the voltage from the rectifier 32 is above the selected valve it causes transistor 33 to conduct heavily thus shorting out the resistors 36, 37 and 38 to reduce the voltage appearing on the base of transistor 42 substantially to cut off. This in turn causes the voltage appearing on the base of transistor 45 to rise sufficiently to cause transistor 45 to conduct heavily thereby reducing the voltage on transistor 46 to substantially its cut off and the unijunction transistor 46 cannot fire and the circuit cannot close until the voltage from rectifier 32 drops below the selected value.

Figure 3:
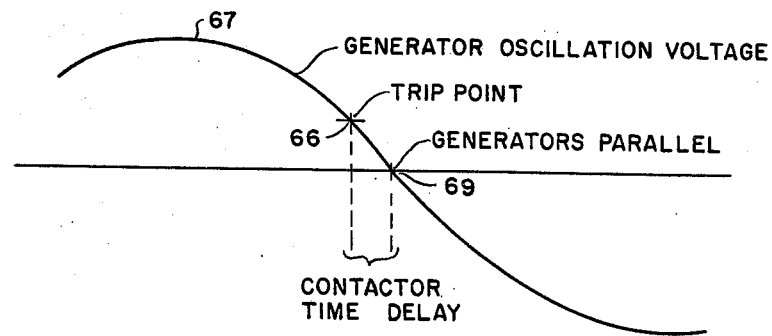
FIG. 3 is a portion of a plot of the generator oscillation voltage showing the time-voltage relation of the trip or firing point.

The value of the voltage at 32 at which the change in operation takes place is determined from a consideration of the delay time introduced in the operation of the system, especially by the mechanical switch 21 of the magnetic contactor 18. This trip point 66 on the oscillation curve 67 in FIG. 3 is set by adjusting variable resistor 38. The ideal point at which to close the switch 21 would be when the oscillation voltage curve 67 passes through zero voltage shown at 69 on FIG. 3.

After the generators are synchronized, the synchronizing system of this invention could be removed from the circuit by suitable switches (not shown).

Obviously many modifications and variations of the present invention are possible in the light of the above teachings. It is therefore to be understood that within the scope if the appended claims the invention may be practiced otherwise than as specifically described.

What is claimed is:

1. A system for parallel connecting at least two alternating current generators having output lines comprising:
   a sensing means connected between corresponding output lines of the generators being connected in parallel for producing an output proportional to the phase difference between the generators;
   a Schmitt trigger circuit;
   detector means responsive to a predetermined voltage level of said sensor output for switching the state of said Schmitt trigger;
   contactor means for completing the circuit to parallel connect the generators; and
   means responsive to one state of said Schmitt trigger for actuating said contactor.

2. A system as claimed in claim 1 in which said sensing means includes:
   a transformer having a primary winding and a secondary winding, said primary winding being connected to corresponding output lines of said generators in voltage opposition; and
   a rectifier circuit connected across said secondary of said transformer, the output of said rectifier being proportional to the voltage phase difference between said generators.

3. A system as claimed in claim 2 in which said detector means includes:
   a transistor, having a base, emitter and collector;
   a power source for said transistor;
   a resistance network connected from said collector of said transistor to the negative side of said power source at least one resistance of said network being variable, said variable resistor being effective to determine the voltage at which said Schmitt trigger is switched.

4. A system as claimed in claim 3 in which said means for actuating said contactor comprises:
   a unijunction diode having a pair of base electrodes and an emitter electrode, said diode having its emitter electrode connected to said Schmitt trigger and to said power source, one of said pair of base electrodes being connected to said power source;
   a second transformer having a second primary and a secondary winding, said second primary winding being connected between the other of said pair of base electrodes and the negative side of said source;
   said contactor means including a second power source;
   a controlled rectifier connected between said second power source and said contactor;
   said second secondary being connected across said controlled rectifier to switch said controlled rectifier from a non-conductive state to its conductive state to actuate said contactor.

5. A system as claimed in claim 1 in which said detector means includes:
   a transistor, having a base, emitter and collector;
   a power source for said transistor;
   a resistance network connected from said collector of said transistor to the negative side of said power source at least one resistance of said network being variable, said variable resistor being effective to determine the voltage at which said Schmitt trigger is switched.

6. A system as claimed in claim 2 in which said detector means includes a resistance network with at least one of said resistors in said network being variable to adjust the point in time with respect to the minimum voltage level of said sensing means at which said contactor operates.

References Cited

UNITED STATES PATENTS 2,862,111 11/1958 Richards et al. _____ 307—87
3,069,555 12/1962 Kessler _____ 307—87

ROBERT K. SCHAEFER, Primary Examiner

H. J. HOHAUSER, Assistant Examiner